UNITED STATES PATENT OFFICE.

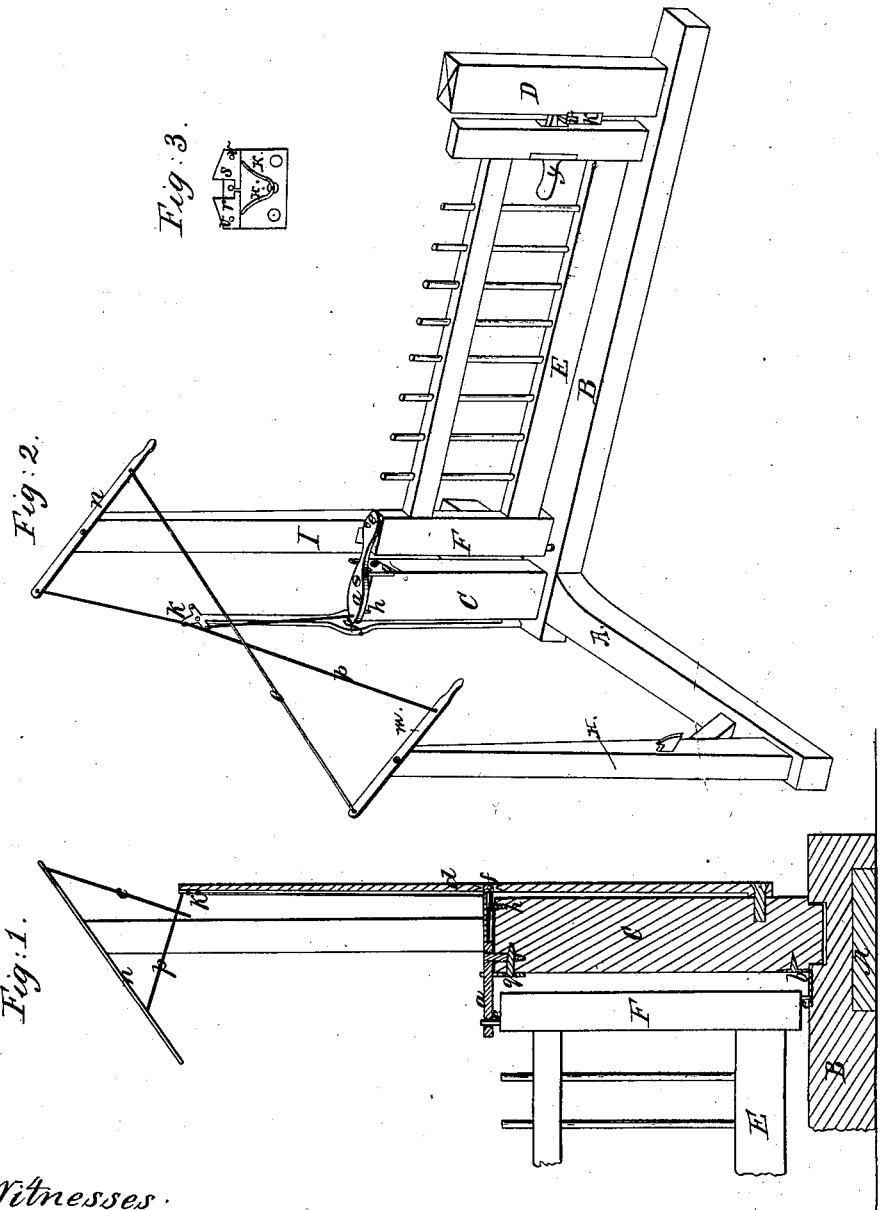

EZRA NICHOLSON, OF EAST ROCKPORT, OHIO.

IMPROVEMENT IN FARM-GATES.

Specification forming part of Letters Patent No. 39,491, dated August 11, 1863; antedated April 18, 1863.

*To all whom it may concern:*

Be it known that I, EZRA NICHOLSON, of the town of Rockport, in the county of Cuyahoga, State of Ohio, have invented a new and useful improvement in the mode of hanging farm-gates so that they may be opened or closed on approaching, the gate operating both ways by its own gravity; and the following is a full, clear, and exact description of the same, reference being had to the accompanying drawings, making a part of this specification.

Figure 1 shows a vertical section cut through the gate-posts, hinges, and mechanism for operating the gate. Fig. 2 represents a perspective view of the gate-frame and gate closed. Fig. 3 is a section of the spring-catches.

My invention consists in the arrangement of a spring-latch operating under a horizontal hinge-lever in combination with stop-plates and other mechanism to hold in position open and closed gates.

To enable others skilled in the art to make and use my improvements in gates, I will describe them more fully, referring to the drawings and the letters thereon.

In order to have a farm-gate operate perfectly and remain durable for many years in a climate where the ground is subject to be disturbed by freezing, it is necessary that the posts and frame-work to which it is attached should be so secured together as to always keep in their relative positions.

In constructing my gate I connect two timbers together at right angles, thus forming the mud-sill A and a cross sill, B, to which I frame the gate-posts C and D and secure them firmly, so that they will keep their upright position. The post C is braced to the timber B by an elbow of metal $b$, which forms the step or cockeye for the bottom pivot or hinge, $c$, of the gate E. On the top of the post C is placed the horizontal lever $a$, the front or forward end extending over a sufficient distance to form the cockeye or hinge, into which the top pivot, $e$, of the gate is fitted. The upright post F of the gate-frame I make of joist. The width may be three or four times the thickness. The main object is to get a sufficient bearing for the top and bottom pivots, they being considerably out of the line of perpendicular with each other—*i. e.*, the bottom pivot, $c$, is near the post C, and the top pivot, $e$, is over on the opposite edge of the upright F. This arrangement throws the gate out of its balance and assists it to open and close by its own gravity. The horizontal lever $a$ or cockeye has a broad bearing, and is pivoted to the center on the top of the post C, and is made to move the top of the gate out of the line of perpendicular either to the right or left by the action of the long vertical lever $d$, attached near the bottom in the rear of the gate-post C, and connected by a loose joint, $f$, near its center with the hinge-lever $a$, which has a cavity under side, in which is fitted to operate a spring-latch, $i$, to hold the gate in a perpendicular position when closed. The latch $i$ rests in a notch in the segment $h$, secured on the top of the post C, and is lifted out so as to allow the lever-hinge $a$ to be moved either way by the action of a bell-crank, $k$, attached to the top of the upright lever $d$. At the ends of the mud-sill are framed upright posts H I of such height as to be convenient for use. On the top are secured movable levers $m$ and $n$, connected together by a rod, $o$, running diagonally from the rear end of one of the levers to the handle of the other, and there is another rod or link, $p$, attached to the levers $m$ $n$ in the same manner and connecting with the bell-crank $k$, so that by moving the levers in the direction in which the gate is approached the spring-latch $i$ is raised, the gate F is thrown out of perpendicular, unlatched, opens, and swings round, is secured till it is passed. Then, by moving the other lever in the same direction the gate unlatches and closes. The force by which the gate will swing in either opening or closing is regulated by the stop-plate $q$ on the top of the gate-post C. The double spring catch K, as seen in Fig. 3, is made of metal, the stops $r$ $s$ working on pivots $u$ $v$ between two plates, the spring $x$ being secured underneath in the center, so that both ends act on the stops and keep them up to their places at all times, when the latch $y$ is not passing over one of them.

I do not claim opening and closing gates by the simple action of a vertical and horizontal lever to move the gate out of a perpendicular, nor placing the hinges out of line; nor do I claim the double spring catch for latching; but What I do claim as my invention, and desire to secure by Letters Patent, is—

The arrangement of the spring-latch $i$ under the hinge-lever $a$, in combination with the notched segment $h$ and stop-plate $g$, the bell-crank $k$, and levers $d$ and $a$, operating substantially in the manner, as and for the purposes herein set forth.

EZRA NICHOLSON.

Witnesses:
F. B. PRATT,
ELI BRUCE.